United States Patent [19]

Miliczky

[11] Patent Number: 4,671,543

[45] Date of Patent: Jun. 9, 1987

[54] BALL AND SOCKET TYPE JOINT FOR USE BETWEEN ADJACENT SECTIONS OF A FLUID CONDUIT AND METHOD OF MANUFACTURING SAME

[75] Inventor: Eugene W. Miliczky, Clarence, N.Y.

[73] Assignee: Advanced Thermal Systems, Inc., Lancaster, N.Y.

[21] Appl. No.: 890,086

[22] Filed: Jul. 24, 1986

[51] Int. Cl.$^4$ ............................................. F16L 27/06
[52] U.S. Cl. ..................................... 285/270; 285/286; 285/294
[58] Field of Search ................. 285/51, 135, 160, 261, 285/271, 270, 294, 297, 286; 403/134, 90

[56] References Cited

U.S. PATENT DOCUMENTS

| | | | |
|---|---|---|---|
| 1,936,805 | 11/1933 | Taylor | 285/286 |
| 2,286,122 | 6/1942 | Stapp | 285/271 |
| 2,475,834 | 7/1949 | Harvey | 285/271 |
| 2,522,171 | 9/1950 | Furman et al. | 285/297 |
| 2,907,593 | 10/1959 | Phillips | 285/271 |
| 3,208,779 | 9/1965 | Sullivan, Jr. | 403/134 |
| 3,741,571 | 6/1973 | Fessler et al. | 285/270 |
| 3,874,706 | 4/1975 | Arnold | 285/261 |
| 4,003,666 | 1/1977 | Gaines et al. | 403/134 |

FOREIGN PATENT DOCUMENTS

| | | | |
|---|---|---|---|
| 728848 | 12/1942 | Fed. Rep. of Germany | 285/271 |
| 2242968 | 3/1973 | Fed. Rep. of Germany | 285/297 |
| 2810238 | 9/1978 | Fed. Rep. of Germany | 285/297 |
| 616401 | 2/1961 | Italy | 285/270 |
| 963910 | 7/1964 | United Kingdom | 285/297 |
| 2021721 | 12/1979 | United Kingdom | 285/261 |

OTHER PUBLICATIONS

Advanced Thermal Systems, Inc. publication, "Flexible Ball Joints", Bulletin BJ-981.

*Primary Examiner*—Cornelius J. Husar
*Assistant Examiner*—Eric K. Nicholson
*Attorney, Agent, or Firm*—David C. Purdue

[57] ABSTRACT

An improved ball and socket type joint for use in a fluid conduit and an improved method of forming such a joint are disclosed. The joint comprises ball and socket portions each provided with communicating internal passageways. The socket portion of the joint is formed from two members, namely a cylindrically draped socket retainer body and a socket transition. A first end of the socket retainer body is provided with a ball retaining flange, while a second end is adapted to mate with and be welded to a neck region provided on the socket transition. The ball portion of the joint includes a spherically shaped end. To assemble the joint, the socket retainer is initially disposed about the spherical end of the ball portion so as to enclose it. The second end of the socket retainer is then moved toward the socket transition until they mate. Lastly, the socket retainer and the socket transition are welded together so as to form an integral socket portion for permanently retaining the ball. The joint is provided with at least one packing cylinder for injecting packing material into the socket portion initially to seal the joint and, subsequently, as required, to seal leaks. The joint according to the invention eliminates many problems, including overtightening, associated with previous ball and socket joints including threaded connections between sections of socket portions.

6 Claims, 2 Drawing Figures

BALL AND SOCKET TYPE JOINT FOR USE BETWEEN ADJACENT SECTIONS OF A FLUID CONDUIT AND METHOD OF MANUFACTURING SAME

BACKGROUND OF THE INVENTION

1. Field of the Invention

The present invention relates in general to flexible connections in fluid conduits and in particular to an improved fluid conducting ball and socket type joint for permitting relative angular movement between adjacent sections of a fluid conduit adapted to carry fluids at high temperatures or pressures.

Fluid conducting ball and socket type joints have found widespread acceptance and use as a means for providing relative angular movement between adjacent sections of a fluid conduit, while continuously permitting the passage of fluid therethrough. Such joints are frequently used in conduits which carry fluids at high temperatures or pressures in order to accommodate expansion and contraction of the conduit sections. It is essential that joints of this type provide a reliable seal between the adjacent conduit sections, especially when fluids at high temperatures or pressures are carried thereby. Also, it is important that such joints be serviceable in a manner which does not require frequent removal of the joint from the conduit, since the time during which the conduit is removed from operation may be very expensive or otherwise inconvenient. Lastly, it is desirable that such joints have a relatively simple structure, so as to minimize the manufacturing and servicing expenses.

2. Description of the Prior Art

Known joints of the type described above are formed having mating ball and socket portions, each having an internal passageway formed therethrough for the passage of fluids. The outer ends of the ball and socket portions are adapted to be secured to respective adjacent sections of a fluid conduit. The inner end of the ball portion of the joint is generally spherical in shape and is adapted to be inserted within a generally hollow cylindrical body of the socket portion. An annular retaining member is adapted to be secured to the open end of the cylindrical body of the socket portion to retain spherical end of the ball portion therein. The retaining member includes a radially inwardly extending flange having an inner diameter which is less than the outer diameter of spherical end of the ball portion. To assemble the joint, the spherical end of the ball portion is initially inserted within the cylindrical body of the the socket portion through the open end thereof. The retaining member is then secured to the open end of the cylindrical body such that the spherical end is retained therein by the flange, while relative angular movement between the mating ball and socket portions is permitted. In one known construction, the retaining member is secured to a radially outwardly extending flange formed about the open end of the cylindrical body by a plurality of threaded fasteners. The threaded fasteners secure the retaining member to the flange and, consequently, to the socket portion. In another known construction, the retaining member and the cylindrical body are formed having cooperating threaded portions, thereby permitting the retaining member to be threaded onto the cylindrical body.

SUMMARY OF THE INVENTION

The present invention relates to an improved ball and socket type joint for use between adjacent sections of a fluid conduit, and further to an improved method of forming such a joint. Ball and socket portions of the joint are provided, each including communicating internal passageways which permit the flow of fluid through the joint. The socket portion of the joint is formed from two members, namely, a socket retainer and a socket transition. The socket retainer includes a body formed generally in the shape of a hollow cylinder. The inner end of the socket retainer body is provided with an integral radially inwardly flange, while the outer end is open and defines an inner diameter. The socket transition includes a reduced diameter neck region having an outer diameter which is slightly smaller than the inner diameter of the open end of the socket retainer. When disposed thereabout, the open end of the socket retainer is adapted to be permanently secured, such as by welding, to the neck region of the socket transition. The ball portion of the joint includes a spherical end which is adapted to be retained within the socket retainer body, so as to permit relative angular movement therebetween. The inner diameter of the socket retainer flange is smaller than the outer diameter of the enclosed spherical end such that the ball portion is retained between the flange and the socket transition, while permitting relative rotational movement. To assemble the joint, the socket retainer is initially disposed about the spherical end of the ball portion so as to enclose it. The socket retainer and the enclosed spherical end are then moved toward the socket transition such that the open end of the socket retainer is received about the reduced diameter neck region of the socket transition. Lastly, the abutting ends of the socket retainer and the socket transition are welded together so as to form an integral socket portion for the joint. Packing material may be injected then into the joint by a packing cylinder attached to the socket retainer.

It is an object of the present invention to provide an improved ball and socket type joint for use between adjacent sections of a fluid conduit.

It is another object of the present invention to provide such a joint which is simple and inexpensive in construction.

It is a further object of the present invention to provide an improved method for forming such a joint.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
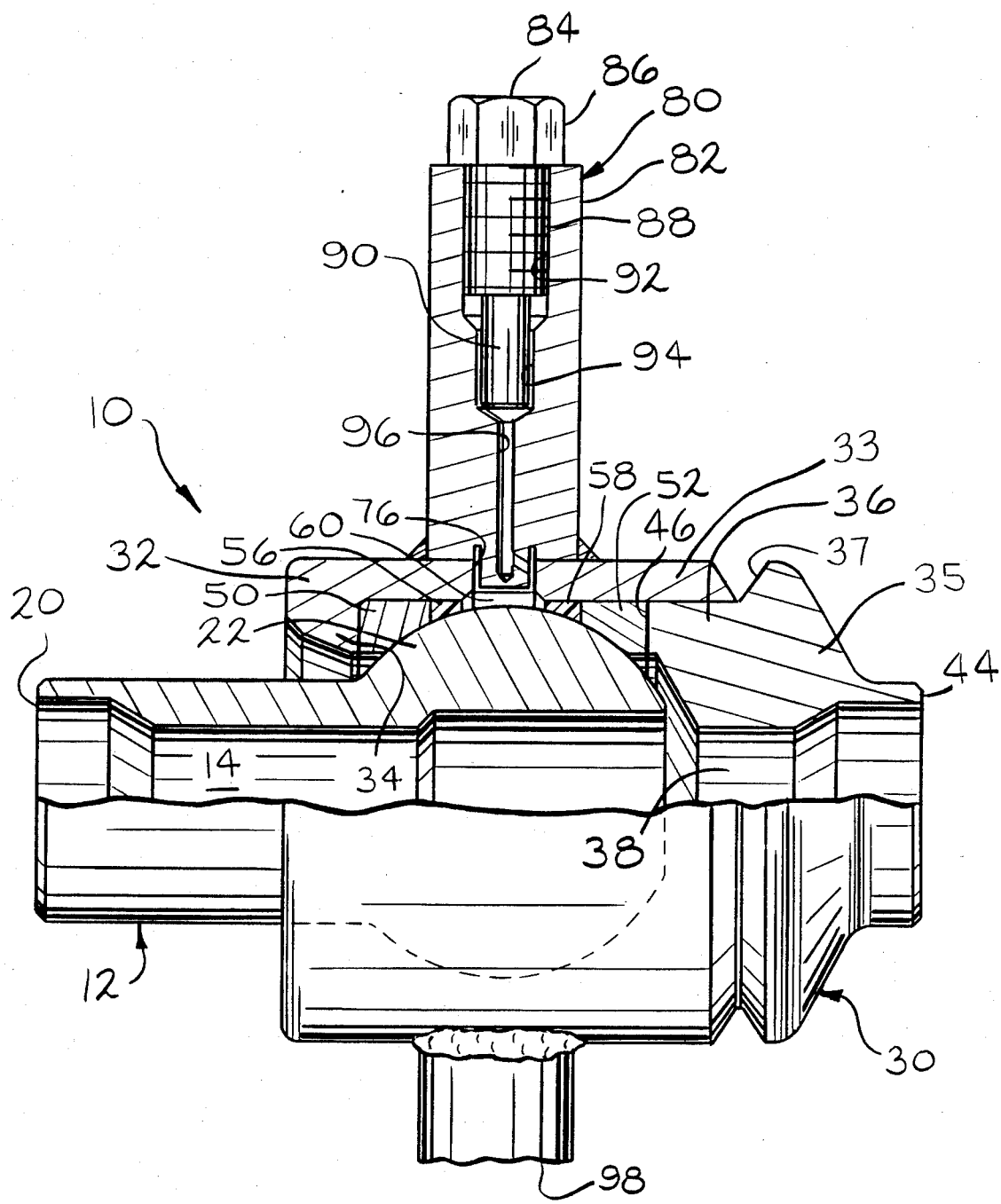
FIG. 1 is a side elevational view, partially in section, of an improved ball and socket type joint in accordance with the present invention shown in an initial assembly condition.
Figure 2:
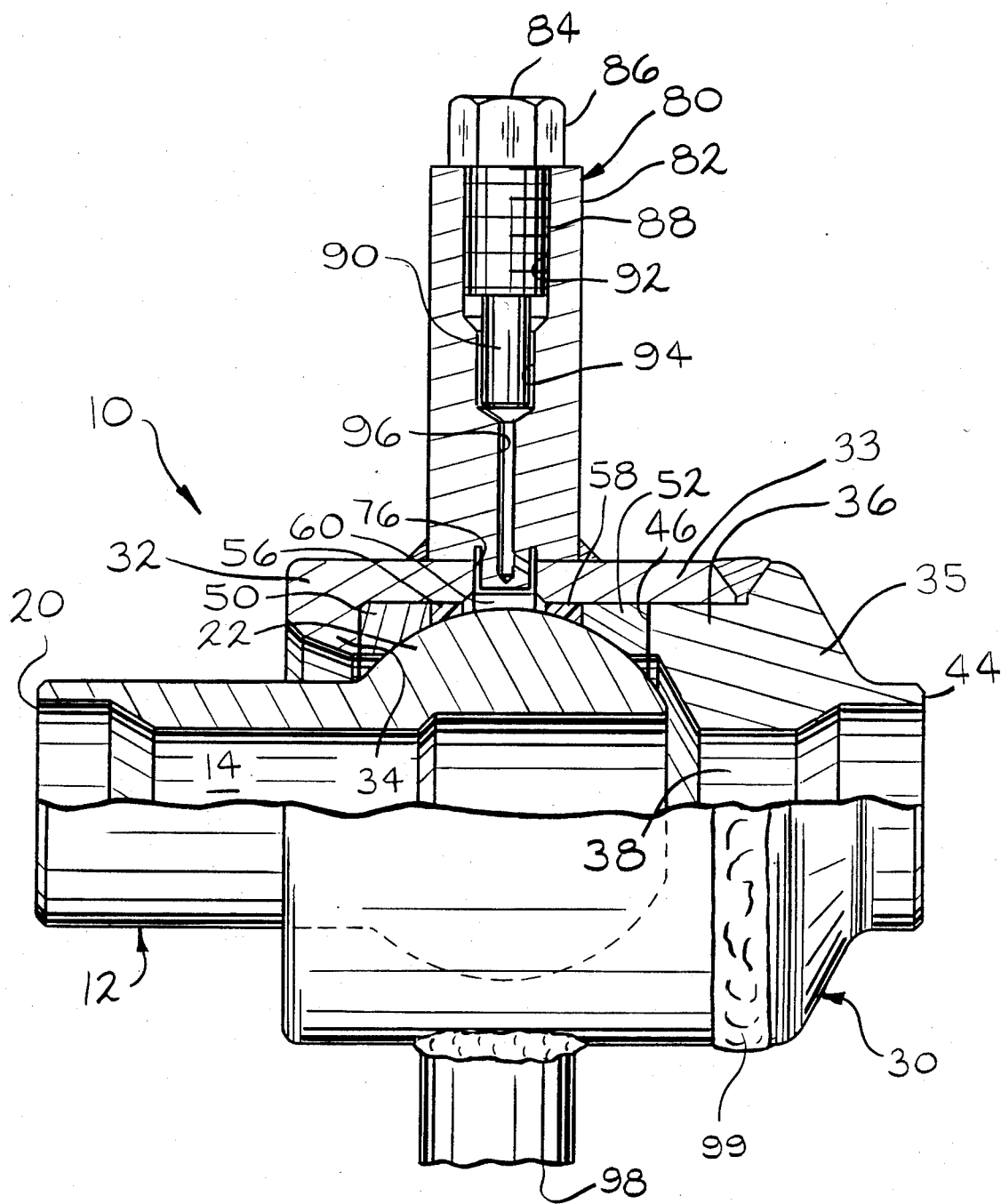
FIG. 2 is a side elevational view similar to FIG. 1, wherein the joint is shown in a final assembly condition.

Referring now to FIGS. 1 and 2, an improved ball and socket type joint in accordance with the present invention is indicated generally at 10. The joint 10 includes a generally cylindrical ball portion, indicated generally at 12, having an internal passageway 14 formed longitudinally therethrough. An outer end 20 of the ball portion 12 is adapted to be secured by any conventional means to a first fluid conduit section (not illustrated). The ball portion 12 is provided with a spherical end 22 opposite the outer end 20. The spherical end 22 of the ball portion 12 is adapted to be retained, in a manner described in detail below, within a socket portion, indicated generally at 30, of the joint 10.

The socket portion 30 is formed from two separate members. One of the members is a socket retainer 32. The socket retainer 32 has a body 33 shaped generally in the form of a hollow cylinder defining a predetermined inner diameter. An inner end of the body 33 of the socket retainer 32 has a flange 34 formed thereon, while the outer end of the body 33 is open. The flange 34 extends radially inwardly from the body so as to define an inner diameter which is less than the inner diameter of the body 33 of the socket retainer 32. The other one of the members utilized to form the socket portion 30 is a socket transition 35. The socket transition 35 is also generally cylindrical in shape and includes a reduced diameter neck region 36. The outer diameter of the neck region 36 is slightly less than the inner diameter of the body 33 of the socket retainer 32. Thus, as shown in FIG. 1, a shoulder 37 is formed about the socket transition 35 at the termination of the neck region 36. In the illustrated embodiment, the open end of the body 33 and the shoulder 37 each taper away from each other, thereby forming a V-shaped circumferential groove when disposed adjacent one another. Other configurations may also be utilized.

As will be explained in greater detail below, the socket retainer 32 is adapted to be received telescopically about the neck region 36 of the socket transition 35. The socket transition 35 is also provided with an internal passageway 38. An outer end 44 of the socket transition 35 is adapted to be secured by any conventional means to a second fluid conduit section (not illustrated). Thus, the internal passageways 14 and 38 provide a passageway through the joint 10 which permits the flow of fluid through the first and second conduit sections. The socket transition 35 and the neck region 36 terminate at an inner end 46.

A first annular compression ring 50 is disposed about the spherical end 22 of the ball portion 12 the adjacent the flange 34 of the socket retainer 32. Similarly, a second annular compression ring 52 is disposed about the spherical end 22 of the ball portion 12 adjacent the inner end 46 of the socket transition 35. The compression rings 50 and 52 can be formed of a ductile iron material. First and second annular containment rings 56 and 58 are disposed about the spherical end 22 adjacent the respective compression rings 50 and 52. The containment rings 56 and 58 may be formed of a polytetrafluoroethylene material. Alternatively, the containment rings 56 and 58 may be formed of asbestos or glass in a matrix with such material. A cavity 60 is defined between the containment rings 56 and 58, the spherical end 22 of the ball portion 12, and the body 33 of the socket retainer 32. The cavity 60 is annular in shape and extends about the largest circumference of the spherical end 22 measured transversely with respect to the longitudinal axes of the ball portion 12 and the socket portion 30.

Prior to placing the joint 10 in service, the annular cavity 60 can be filled with a conventional compressible packing material (not shown) to provide a reliable seal between the ball portion 12 and the socket portion 30. The packing material may be injected into the annular cavity 60 through an aperture 76 formed through the socket retainer 32. The aperture 76 is formed through the socket retainer 32 in a direction which is transverse to the longitudinal axis thereof. The aperture 76 extends into the annular cavity 60 formed about the spherical end 22. A packing cylinder assembly, indicated generally at 80, is welded to the exterior surface of the body 33 of the socket retainer 32. The packing cylinder assembly 80 includes a packing cylinder 82 and a packing plunger 84. The packing plunger 84 comprises a head 86, an externally threaded central portion 88, and a cylindrical plunger end portion 90. The packing cylinder 82 is provided with an internal passageway including an internally threaded section 92. The internally threaded section 92 is configured to engage the externally threaded central portion 88 of the packing plunger 84. The internal passageway of the packing cylinder 82 further includes a narrowed plunger receiving portion 94 and a connecting passageway 96. When the packing cylinder 82 is welded to the body 33 of the socket retainer 32, the connecting passageway 96 communicates with the annular cavity 60. The packing cylinder assembly 80 is utilized to inject packing material into the annular cavity 60 in a manner described in detail in U.S. patent application Ser. No. 719,545, filed Apr. 3, 1985, and assigned to the owner of the present invention. The disclosure of such patent application is hereby incorporated by reference. A second packing cylinder assembly, indicated generally at 98, is welded to the exterior surface of the body 33 of the socket retainer 32 opposite the packing cylinder assembly 80. Additional packing cylinder assemblies (not shown) may be provided about the periphery of the body 33, depending upon the size of the joint 10.

The above-referenced patent application describes the process of injecting packing material into the annular cavity 60 is described in detail. Briefly, however, a plug (not shown) of packing material is inserted in the plunger receiving portion 94 of the packing cylinder 82 when the packing plunger 84 removed therefrom. The packing plunger 84 is then inserted in the packing cylinder 82 and rotated such that the threaded central portion 88 engages the internal threads 92 formed in the packing cylinder 82. Such rotation is continued until the head 86 seats on the packing cylinder 82, as shown in FIG. 1. As the plunger portion 90 is advanced into the plunger receiving portion 94, the plug of packing material is forced through the connecting passageway 96 and the aperture 76 into the annular cavity 60. Additional plugs of packing material are injected in a similar fashion.

The joint 10 can be assembled in the following fashion. First, the compression ring 50 is inserted within the open end of the socket retainer 32 so as to be disposed adjacent the flange 34. Next, the containment ring 56 is inserted in a similar manner so as to be disposed adjacent the compression ring 50. The open end of the socket retainer 32 is then inserted about the outer end 22 of the ball portion 12 and move inwardly until the body 33 encloses the spherical end 22. Thus, the flange 34, the compression ring 50, the containment ring 56, and the spherical end 22 abut one another. The other containment ring 58 and the other compression ring 52 are next inserted within the socket retainer 32 in the order illustrated in FIGS. 1 and 2. Next, the socket transition 35 is moved toward the socket retainer 32 such that the neck region 36 of the socket transition 35 is received telescopically within the open end of the body 33 of the socket retainer 32. Preferably, the longitudinal lengths of the cylindrical body 33 and the neck region 36 are sized to provide a predetermined amount of compression of the compression rings 50 and 52 and the containment rings 56 and 58 when the inner diameter of the open end of the body 33 abuts the inner diameter of the shoulder 37 of the neck region 36. When so disposed, the socket retainer 32 and the socket transition 35 can be permanently secured together, such as by the welding 99 or other means, to form the unitary socket portion 30. Thus, it will be appreciated that the joint 10 of the present invention cannot be disassembled once it has been completely assembled.

The structure of the present invention is preferable over known ball and socket type joints in several respects. First, the structure of the joint is formed of fewer separate pieces than prior joints. As a result, the overall cost of the joint 10 is reduced. Second, the thickness of the flange 34 can be formed less than would otherwise be required if the flange 34 were formed as a separate member from the socket retainer 32. In prior joints, as described above, the flange was connected to the socket retainer by a threaded portion or by a plurality of threaded fasteners. Flanges of this type are subject to stresses during use which required extra material to insure reliable performance. Since the flange 34 is permanently secured to the socket retainer 32, it is much more resistant to movement during use. Therefore, a lesser amount of material can be utilized to form the flange 34 having the same degree of strength. Third, the structure of the present invention is simpler in construction than prior joints, thus enhancing the safety and reliability thereof. Last, in prior joints, the flange had to be manually fastened to the socket portion, either by threading thereon or by threaded fasteners. In either instance, the amount of force utilized to fasten the flange had to be carefully monitored to insure than the amount of compression of the compression rings 50 and 52 and of the containment rings 56 and 58 was within a predetermined range. A loose connection might cause leakage of fluid from the conduit, while a tight connection might cause the spherical end of the ball portion to be frictionally engaged by the other components of the joint, thereby preventing relative angular movement of the ball and socket portions. The present invention avoids this situation by forming the flange integrally with the socket portion. Additionally, since such joints are frequently utilized in corrosive environments, the present invention is desirable because it contains no moving parts which are exposed to corrosion. In prior joints, the threaded fasteners or the threaded portions of the flange and socket were exposed to corrosion, thereby making tightening or loosening adjustments extremely difficult. All of the moving members of the present invention are protectively enclosed within the exterior of the joint 10.

In accordance with the provisions of the patent statutes, the principle and mode of operation of the present invention have been explained and illustrated in its preferred embodiment. However, it must be understood that the present invention can be practiced otherwise than as specifically explained and illustrated without departing from its spirit or scope.

What is claimed is:

1. A ball joint for permanent installation in a fluid conduit, said ball joint comprising, in combination,
    a ball including a spherical portion, said ball being provided with an internal, longitudinally extending passageway,
    a socket comprising a cylindrical section having first and second ends, said socket including an integral, radially inwardly extending, ball retaining flange at said first end, said socket having an interior sized to receive said ball, said socket being provided with at least one aperture extending through said cylindrical section,
    a socket transition element including a socket receiving section configured to mate with and to be welded to said second end of said socket, said socket transition element being provided with an internal, longitudinally extending passageway which communicates with the internal passageway provided in said ball when said socket receiving section is welded to said second end of said socket section,
    compression means for positioning said ball within said socket and minimizing non-rotational movement therebetween, and
    packing cylinder means for injecting packing material through said at least one aperture to the interior of said socket.

2. The ball joint claimed in claim 1 wherein said compression means comprise at least two compression rings composed of iron.

3. In a fluid conduit comprising a first conduit section and a second conduit section, a ball joint comprising, in combination,
    a ball portion having first and second ends, said ball portion including a spherical portion at said first end, said ball portion being provided with an internal, longitudinally extending passageway, said second end of said ball portion being welded to said first conduit section,
    a socket portion comprising a cylindrical section having first and second ends, said socket portion including an integral, radially, inwardly extending, ball retaining flange at said first end of said socket portion, said socket portion having an interior sized to receive said ball, said socket being provided with at least one aperture extending through said cylindrical section,
    a socket transition element having first and second ends, said first end of said socket transition element including a socket receiving section welded to said second end of said socket, said socket transition element being provided with an internal, longitudinally extending passageway in communication with the internal, longitudinally extending passageway provided in said ball portion, said second end of said socket transition element being welded to said second conduit section,
    compression means positioning said ball portion within said socket portion for minimizing non-rotational movement therebetween, and
    packing cylinder means for injecting packing material through said at least one aperture to the interior of said socket portion.

4. The ball joint claimed in claim 3 wherein said compression means comprise at least two compression rings composed of iron.

5. A method for installing a ball joint in a fluid conduit to provide for communication between and limited, relative rotational movement between first and second adjacent sections of said fluid conduit, said method comprising the steps of:

positioning a socket around a spherical portion of a ball, said socket comprising a cylindrical section having first and second ends, said socket including an integral, radially inwardly extending, ball retaining flange at said first end, said socket having an interior sized to receive the spherical portion of said ball, juxtaposing said second end of said socket and a socket receiving section of a socket transition element, welding said second end of said socket to said socket receiving section to retain said ball between said flange and said socket transition element, and injecting packing material, as needed, through packing cylinder means and through at least one aperture provided in said socket to the interior of said socket to prevent leakage through the ball joint, welding said first section of conduit to said ball, and welding said second section of conduit to said socket transition.

6. The method as claimed in claim 5 including the additional steps of:

inserting compression means in said socket portion before the spherical portion of said ball portion is disposed in said socket and inserting compression means in said socket after said ball is disposed in said socket and before said second end of said socket is welded to said socket receiving section.

* * * * *